US012561446B2

(12) United States Patent
Shen et al.

(10) Patent No.: US 12,561,446 B2
(45) Date of Patent: Feb. 24, 2026

(54) ARTIFICIAL INTELLIGENCE TECHNIQUES FOR IDENTIFYING IDENTITY MANIPULATION

(71) Applicant: EQUIFAX INC., Atlanta, GA (US)

(72) Inventors: Cuizhen Shen, Duluth, GA (US); Arunkumar Ranganathan, Cumming, GA (US); Daniel Lim, Atlanta, GA (US); Philip Munguia, Atlanta, GA (US)

(73) Assignee: EQUIFAX INC., Atlanta, GA (US)

( * ) Notice: Subject to any disclaimer, the term of this patent is extended or adjusted under 35 U.S.C. 154(b) by 197 days.

(21) Appl. No.: 18/460,415

(22) Filed: Sep. 1, 2023

(65) Prior Publication Data

US 2025/0077680 A1 Mar. 6, 2025

(51) Int. Cl.
G06F 21/57 (2013.01)

(52) U.S. Cl.
CPC ...... G06F 21/577 (2013.01); G06F 2221/034 (2013.01)

(58) Field of Classification Search
None
See application file for complete search history.

(56) References Cited

U.S. PATENT DOCUMENTS

2018/0109507 A1* 4/2018 Caldera .................. H04L 63/08
2019/0251272 A1* 8/2019 Ravizza ............ G06F 18/23213
2020/0193038 A1* 6/2020 Ravizza .............. G06F 16/9024
2020/0286016 A1* 9/2020 Singh ...................... H04W 4/70
2020/0320619 A1* 10/2020 Motaharian ........ G06Q 30/0185
2021/0136089 A1* 5/2021 Costea ............... H04L 63/1425
2023/0245139 A1* 8/2023 Shen .................. G06Q 30/0185
705/318
2024/0214426 A1* 6/2024 Sen ..................... H04L 63/1433

OTHER PUBLICATIONS

International Application No. PCT/US2024/042496, International Search Report and Written Opinion, Mailed on Nov. 8, 2024, 11 pages.

* cited by examiner

*Primary Examiner* — Kaveh Abrishamkar
(74) *Attorney, Agent, or Firm* — Kilpatrick Townsend & Stockton LLP

(57) ABSTRACT

A system can efficiently determine whether an identity is manipulated. The system can receive entity data and interaction data associated with a target entity. The system can determine, based on the entity data and the interaction data, one or more risk signals associated with the target entity using one or more artificial intelligence models. The system can generate a linked graph structure based on a first graph structure and a second graph structure each generated using the entity data and the interaction data. The system can apply the one or more risk signals to the linked graph structure to determine a risk indicator associated with the target entity. The system can provide a responsive message based on the risk indicator. The responsive message can be used to control access of the target entity to an interactive computing environment.

17 Claims, 5 Drawing Sheets

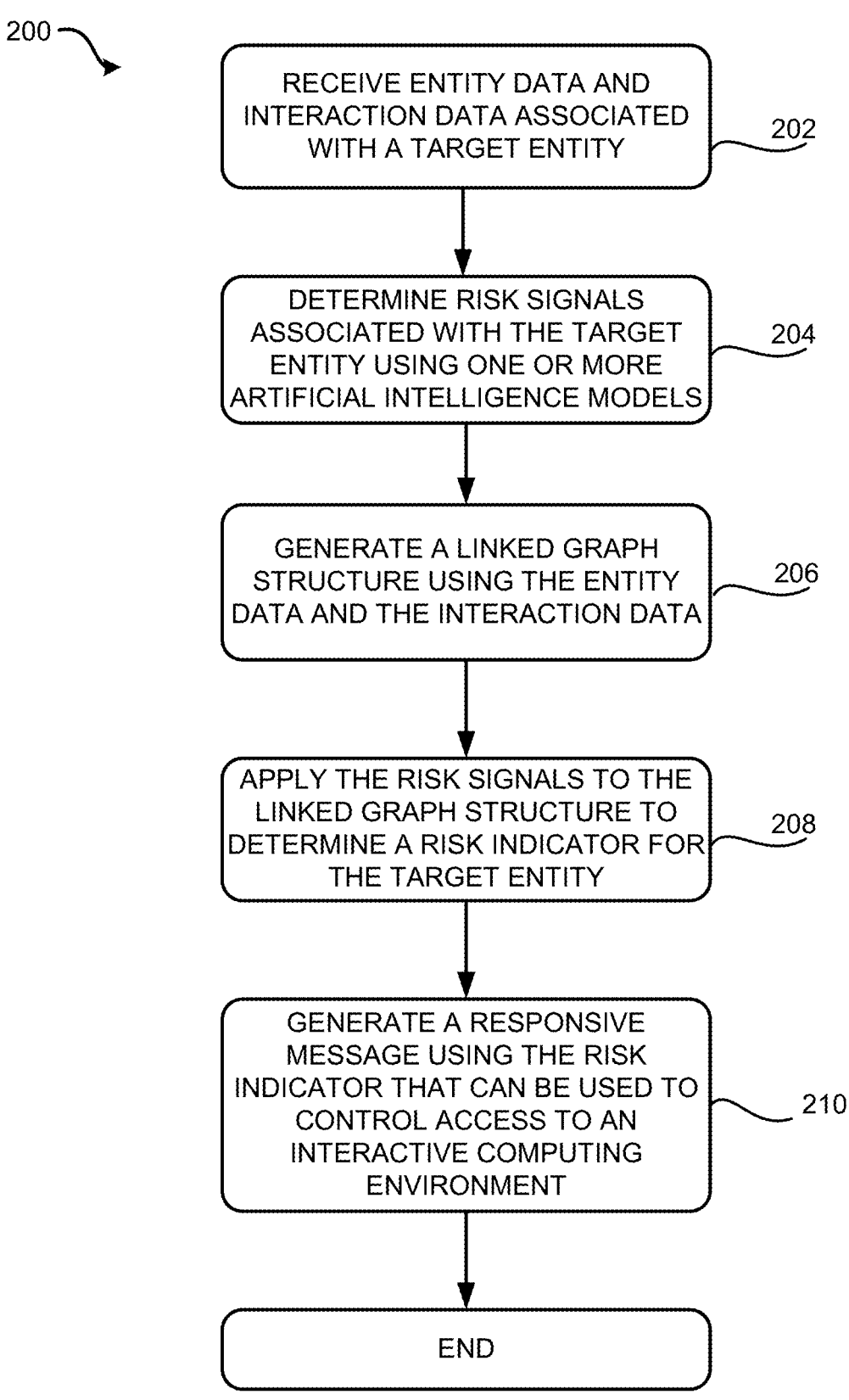

200

RECEIVE ENTITY DATA AND INTERACTION DATA ASSOCIATED WITH A TARGET ENTITY — 202

DETERMINE RISK SIGNALS ASSOCIATED WITH THE TARGET ENTITY USING ONE OR MORE ARTIFICIAL INTELLIGENCE MODELS — 204

GENERATE A LINKED GRAPH STRUCTURE USING THE ENTITY DATA AND THE INTERACTION DATA — 206

APPLY THE RISK SIGNALS TO THE LINKED GRAPH STRUCTURE TO DETERMINE A RISK INDICATOR FOR THE TARGET ENTITY — 208

GENERATE A RESPONSIVE MESSAGE USING THE RISK INDICATOR THAT CAN BE USED TO CONTROL ACCESS TO AN INTERACTIVE COMPUTING ENVIRONMENT — 210

END

FIG. 2

ARTIFICIAL INTELLIGENCE TECHNIQUES FOR IDENTIFYING IDENTITY MANIPULATION

TECHNICAL FIELD

The present disclosure relates generally to risk assessment and interaction control. More specifically, but not by way of limitation, this disclosure relates to identifying identity manipulation using artificial intelligence techniques.

BACKGROUND

Various interactions are performed frequently through an interactive computing environment such as a website, a user interface, etc. The interactions may involve transferring resources for or otherwise based on content. The content may include computing resources or other products or services desired by an entity that may transfer the resources. Determining whether identities involved in the interactions or other potential interactions are legitimate can be difficult. Further, failing to determine whether the identities associated with the interactions are legitimate can allow malicious interactions to proceed.

SUMMARY

Various aspects of the present disclosure provide systems and methods for using artificial intelligence techniques to determine identity manipulation. The system can include a processor and a non-transitory computer-readable medium that includes instructions that are executable by the processor to cause the processor to perform various operations. The system can receive entity data and interaction data associated with a target entity. The system can determine, based on the entity data and the interaction data, one or more risk signals associated with the target entity using one or more artificial intelligence models. The system can generate a linked graph structure based on a first graph structure and a second graph structure each generatable using the entity data and the interaction data. The system can apply the one or more risk signals to the linked graph structure to determine a risk indicator associated with the target entity. The system can provide a responsive message based on the risk indicator. The responsive message can be used to control access of the target entity to an interactive computing environment.

In other aspects, a method can be used to determine identity manipulation using artificial intelligence techniques. The method can include receiving, by a computing device, entity data and interaction data associated with a target entity. The method can include determining, by the computing device and based on the entity data and the interaction data, one or more risk signals associated with the target entity using one or more artificial intelligence models. The method can include generating, by the computing device, a linked graph structure based on a first graph structure and a second graph structure each generated using the entity data and the interaction data. The method can include applying, by the computing device, the one or more risk signals to the linked graph structure to determine a risk indicator associated with the target entity. The method can include providing, by the computing device, a responsive message based on the risk indicator. The responsive message can be used to control access of the target entity to an interactive computing environment.

In other aspects, a non-transitory computer-readable medium can include instructions that are executable by a processing device for causing the processing device to perform various operations. The operations can include receiving entity data and interaction data associated with a target entity. The operations can include determining, based on the entity data and the interaction data, one or more risk signals associated with the target entity using one or more artificial intelligence models. The operations can include generating a linked graph structure based on a first graph structure and a second graph structure each generatable using the entity data and the interaction data. The operations can include applying the one or more risk signals to the linked graph structure to determine a risk indicator associated with the target entity. The operations can include providing a responsive message based on the risk indicator. The responsive message can be used to control access of the target entity to an interactive computing environment.

This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

The foregoing, together with other features and examples, will become more apparent upon referring to the following specification, claims, and accompanying drawings.

BRIEF DESCRIPTION OF DRAWINGS

FIG. 2 is a flowchart illustrating an example of a process for determining whether an identity is manipulated using artificial intelligence techniques according to certain aspects of the present disclosure.

DETAILED DESCRIPTION

Figure 1:
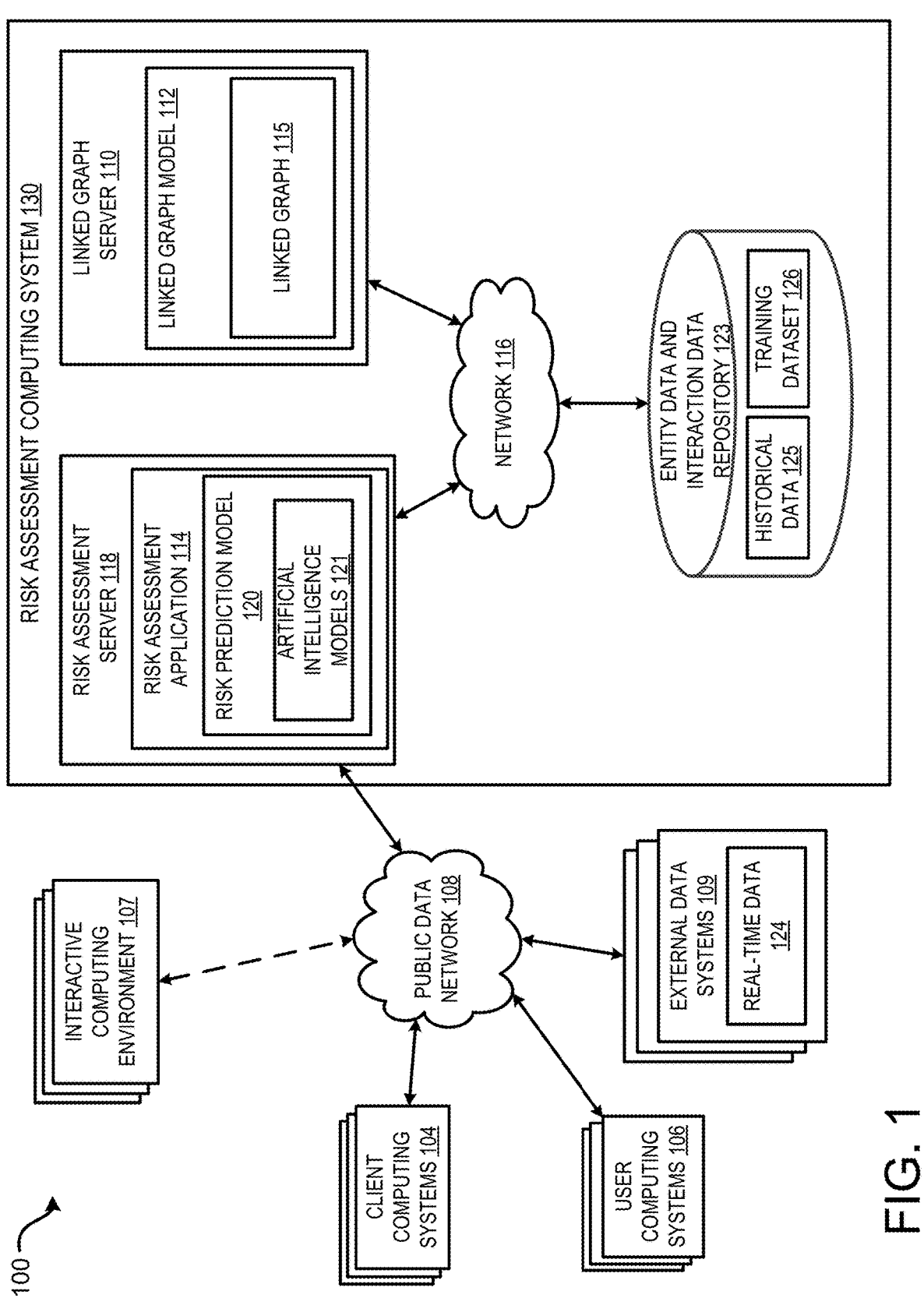
FIG. 1 is a block diagram illustrating an example of a computing environment in which artificial intelligence techniques can be used to determine whether an identity is manipulated according to certain aspects of the present disclosure.

Identifying a manipulated identity can improve the security of an interactive computing environment, can improve the security of an interaction, and the like. For example, requiring a username/password combination, multi-factor authentication, biometric authentication, and the like to access the interactive computing environment can provide security for sensitive accounts or data included in the interactive computing environment. Additionally, requiring personally identifiable information prior to initiating an interaction can provide security for sensitive data associated with the interaction. But the foregoing techniques may not involve or otherwise consider whether the target entity attempting to access the interactive computing environment or attempting to engage in the interaction is associated with increased security or malicious action risk or whether the target entity has, or has provided, a manipulated identity. A manipulated identity may be or include a false identity, a doctored identity, or otherwise an identity that is not a true identity of the target entity.

Certain aspects described herein for using artificial intelligence techniques to identify whether an identity has been manipulated can address one or more of the foregoing issues. For example, one or more artificial intelligence models can be used to determine one or more risk signals associated with the target entity or an identity associated therewith. In some examples, the one or more risk signals may be or include one or more scores that indicate a likelihood that a particular identity data point (or combination of identity data points) or a particular interaction data point (or a combination of interaction data points) is associated with a manipulated identity. The target entity can include a user, such as an individual, or other suitable type of entity. The one or more risk signals can be applied to a linked graph structure that may represent entity data and interaction data involving the target entity or the identity. In some examples, the linked graph structure, or any other graph structure described herein, may be or include a cluster graph having nodes and connections, may be or include a directed acyclic graph with nodes and connections, or the like. The one or more risk signals can be applied to the linked graph structure to determine a risk indicator, which can be used to determine a likelihood of the identity of the target entity being at least associated with manipulation, for the target entity.

In some examples, the one or more artificial intelligence models, or any other suitable computer-based model, may generate the linked graph structure based at least in part on entity data and interaction data associated with the target entity, or associated with an identity provided by the target entity. The entity data and the interaction data may include historical data, real-time data, or a combination thereof. For example, a computing system can access historical data about the target entity to receive the entity data and the interaction data. Additionally or alternatively, the computing system may receive real-time data about the target entity to receive the entity data and the interaction data. The entity data and the interaction data may include identity information about, or provided by, the target entity, name information associated with the target entity, account information associated with the target entity, device information associated with the target entity, or any combination thereof. The linked graph can be generated using the foregoing data, and the computing system can apply the one or more risk signals to the linked graph.

The one or more risk signals may be generated by the one or more artificial intelligence models. For example, the one or more artificial intelligence models can include one or more machine-learning models that may include at least one clustering model, at least one graph mining model, or a combination thereof. The one or more artificial intelligence models may receive at least a subset of the entity data and the interactions data and may be trained to output the one or more risk signals. In some examples, the one or more risk signals may indicate a likelihood that the entity data and the interaction data associated with the target entity may be involved with fraudulent activity, may be associated with a manipulated identity, and the like. A manipulated identity may include an identity provided by the target entity that is not accurate, that is artificially altered from an original state, that is a deviation from an expected identity of the target entity, and the like. Additionally or alternatively, a manipulated identity may be an indicator that any entity or interaction associated therewith may involve malicious or fraudulent activity. The computing system can apply the one or more risk signals to the linked graph to generate a risk indicator, which may indicate an overall level of risk that the target entity is associated with a manipulated identity, a malicious or fraudulent interaction, or the like. The risk indicator can be used to transmit a responsive message for performing one or more operations such as controlling access to an interactive computing environment, determining whether an identity provided by the target entity is legitimate, controlling a real-world interaction, and the like.

The interactive computing environment can be provided by a client computing system. For example, the client computing system can be, or may be controlled by, an entity that may provide software as a service, infrastructure as a service, and other suitable services accessible by a user computing system that can be used or otherwise accessed by the target entity. In some examples, the interactive computing environment can include a user interface. The target entity can use the user computing system to request access to a particular user interface that can be used to request services or other suitable computing resources from the client computing system. For example, the target entity can request a credit line, cloud computing storage resources, or any other suitable services or computing resources from the client computing system via the interactive computing environment. In other examples, the interactive computing environment can include one or more websites or sub-pages thereof. For example, the interactive computing environment can include a secure website provided by the client computing system. The secure website can include cloud computing storage or other resources, and the client computing system can control access of the target entity to the secure website via a profile of the target entity and, optionally, other suitable security techniques such as multi-factor authentication, username/password combinations, etc.

In some examples, the artificial intelligence techniques can be used for other suitable purposes in addition to, or alternative to, controlling access to the interactive computing environment. For example, the artificial intelligence techniques can be used to verify an identity of the target entity, to determine whether to provide real-world goods and/or services on behalf of the target entity or other entities, and the like. The artificial intelligence techniques can involve applying one or more risk signals to a linked graph to determine, for example with respect to an online interaction or a real-world interaction, a likelihood that the target entity has provided a genuine identity. In another example, a client, such as a provider of restricted or regulated goods or services, can use the artificial intelligence techniques to determine whether to provide the restricted or regulated goods or services to the target entity. In some examples, the artificial intelligence techniques can be generally used for digital enablement of an interaction with respect to the target entity.

Certain aspects described herein, which can include generating one or more risk signals using one or more artificial intelligence models, applying the one or more risk signals to the linked graph to generate a risk indicator, and providing a responsive message using the risk indicator, can improve at least the technical field of access control for a computing environment. For instance, by using the risk indicator generated using artificial intelligence techniques, a risk assessment computing system may provide legitimate access to the interactive computing environment using fewer computing resources compared to other risk assessment systems or techniques. For example, the risk indicator can be determined using less data about the target entity than other techniques, which may rely on identifying data such as fingerprints, facial scans, and the like. By using less data, (i) memory usage, (ii) processing time, (iii) network bandwidth usage, (iv) response time, and the like for controlling access to the interactive computing environment is reduced, and functioning of a computing device is improved. Accordingly, the risk assessment computing system improves the access control for computing environment by reducing memory usage, processing time, network bandwidth consumption, response time, and the like with respect to controlling access to the interactive computing environment using at least the artificial intelligence techniques described herein.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative examples but, like the illustrative examples, should not be used to limit the present disclosure.

Operating Environment Example for Controlling Access to a Computing Environment

Referring now to the drawings, FIG. 1 is a block diagram depicting an example of a computing environment 100 in which artificial intelligence techniques can be used to determine whether an identity is manipulated according to certain aspects of the present disclosure. FIG. 1 illustrates examples of hardware components of a risk assessment computing system 130, according to some aspects. The risk assessment computing system 130 can be a specialized computing system that may be used for processing large amounts of data, such as for controlling access to the interactive computing environment 107, for generating a linked graph 115, for determining a likelihood that an identity provided by a target entity may be manipulated, etc., using a large number of computer processing cycles. The risk assessment computing system 130 can include a risk assessment server 118 for validating risk assessment data from various sources. In some examples, the risk assessment computing system 130 can include other suitable components, servers, subsystems, and the like.

The risk assessment server 118 can include one or more processing devices that can execute program code, such as a risk assessment application 114, a risk prediction model 120, artificial intelligence models 121, and the like. The program code can be stored on a non-transitory computer-readable medium or other suitable medium. The risk assessment server 118 can perform risk assessment validation operations or access control operations for validating or otherwise authenticating, for example using other suitable modules, models, components, etc. of the risk assessment server 118, received data such as entity data and interaction data (e.g., real-time data 124, historical data 125, etc.), and the like received from the user computing systems 106, client computing systems 104, external data systems 109, one or more data repositories, or any suitable combination thereof. In some aspects, the risk assessment application 114 can authenticate the request by utilizing the real-time data 124, the historical data 125, any combination thereof, or any information determined therefrom.

Real-time data 124 may be received by the external data systems 109, though the real-time data 124 may be received from other suitable sources. The historical data 125 can be determined or stored in one or more network-attached storage units on which various repositories, databases, or other structures are stored. An example of these data structures can include the entity data and interaction data repository 123. Additionally or alternatively, a training dataset 126 can be stored in the entity data and interaction data repository 123. In some examples, the training dataset 126 can be used to train the artificial intelligence models 121, one or more machine-learning models, which may include the risk assessment application 114, a linked graph model 112, and the like, etc. The artificial intelligence models 121 can be trained to generate one or more risk signals based on the real-time data 124 and the historical data 125, and the machine-learning models can be trained to determine a risk indicator based at least in part on the linked graph 115, to control access to the interactive computing environment 107 using the risk indicator, or to otherwise provide digital enablement for the target entity, etc.

Network-attached storage units may store a variety of different types of data organized in a variety of different ways and from a variety of different sources. For example, the network-attached storage unit may include storage other than primary storage located within the risk assessment server 118 that is directly accessible by processors located therein. In some aspects, the network-attached storage unit may include secondary, tertiary, or auxiliary storage, such as large hard drives, servers, and virtual memory, among other types of suitable storage. Storage devices may include portable or non-portable storage devices, optical storage devices, and various other mediums capable of storing and containing data. A machine-readable storage medium or computer-readable storage medium may include a non-transitory medium in which data can be stored and that does not include carrier waves or transitory electronic signals. Examples of a non-transitory medium may include, for example, a magnetic disk or tape, optical storage media such as a compact disk or digital versatile disk, flash memory, memory devices, or other suitable media.

Furthermore, the risk assessment computing system 130 can communicate with various other computing systems. The other computing systems can include user computing systems 106, such as smartphones, personal computers, etc., client computing systems 104, and other suitable computing systems. For example, user computing systems 106 may transmit, such as in response to receiving input from the target entity, requests for accessing the interactive computing environment 107 to the client computing systems 104. In response, the client computing systems 104 can send authentication queries to the risk assessment server 118, and the risk assessment server 118 can receive entity data about the target entity for generating risk signals, generating the linked graph 115, determining a risk indicator, or a combination thereof. While FIG. 1 illustrates that the risk assessment computing system 130 and the client computing systems 104 are separate systems, the risk assessment computing system 130 and the client computing systems 104 can be one system. For example, the risk assessment computing system 130 can be a part of the client computing systems 104, or vice versa.

As illustrated in FIG. 1, the risk assessment computing system 130 may interact with the client computing systems 104, the user computing systems 106, or a combination thereof via one or more public data networks 108 to facilitate interactions between users of the user computing systems 106 and the interactive computing environment 107. For example, the risk assessment computing system 130 can facilitate the client computing systems 104 providing a user interface to the user computing system 106 for receiving various data from the user. The risk assessment computing system 130 can transmit validated risk assessment data, for example similarity-preserving hashes, comparisons or scores determined therefrom, etc., to the client computing systems 104 for providing, challenging, or rejecting, etc. access of the target entity to the interactive computing environment 107. In some examples, the risk assessment computing system 130 can additionally communicate with third-party systems, such as external data systems 109 to receive risk assessment data, entity data, interaction data, and the like, through the public data network 108. In some examples, the third-party systems can provide real-time (e.g., streamed) data about the target entity, historical data about the target entity, etc. to the risk assessment computing system 130.

Each client computing system 104 may include one or more devices such as individual servers or groups of servers operating in a distributed manner. A client computing system 104 can include any computing device or group of computing devices operated by a seller, lender, or other suitable entity that can provide products or services. The client computing system 104 can include one or more server devices. The one or more server devices can include or can otherwise access one or more non-transitory computer-readable media.

The client computing system 104 can further include one or more processing devices that can be capable of providing an interactive computing environment 107, such as a user interface, etc., that can perform various operations. The interactive computing environment 107 can include executable instructions stored in one or more non-transitory computer-readable media. The instructions providing the interactive computing environment can configure one or more processing devices to perform the various operations. In some aspects, the executable instructions for the interactive computing environment can include instructions that provide one or more graphical interfaces. The graphical interfaces can be used by a user computing system 106 to access various functions of the interactive computing environment 107. For instance, the interactive computing environment 107 may transmit data to and receive data, such as via the graphical interface, from a user computing system 106 to shift between different states of the interactive computing environment 107, where the different states allow one or more electronic interactions between the user computing system 106 and the client computing system 104 to be performed.

In some examples, the client computing system 104 may include other computing resources associated therewith (e.g., not shown in FIG. 1), such as server computers hosting and managing virtual machine instances for providing cloud computing services, server computers hosting and managing online storage resources for users, server computers for providing database services, and others. The interaction between the user computing system 106, the client computing system 104, and the risk assessment computing system 130, or any suitable sub-combination thereof may be performed through graphical user interfaces, such as the user interface, presented by the risk assessment computing system 130, the client computing system 104, other suitable computing systems of the computing environment 100, or any suitable combination thereof. The graphical user interfaces can be presented to the user computing system 106. Application programming interface (API) calls, web service calls, or other suitable techniques can be used to facilitate interaction between any suitable combination or sub-combination of the client computing system 104, the user computing system 106, and the risk assessment computing system 130.

A user computing system 106 can include any computing device or other communication device that can be operated by a user or entity, such as the target entity, which may include a consumer or a customer. The user computing system 106 can include one or more computing devices such as laptops, smartphones, and other personal computing devices. A user computing system 106 can include executable instructions stored in one or more non-transitory computer-readable media. The user computing system 106 can additionally include one or more processing devices configured to execute program code to perform various operations. In various examples, the user computing system 106 can allow a user to access certain online services or other suitable products, services, or computing resources from a client computing system 104, to engage in mobile commerce with the client computing system 104, to obtain controlled access to electronic content, such as the interactive computing environment 107, hosted by the client computing system 104, etc.

In some examples, the target entity can use the user computing system 106 to engage in an electronic interaction with the client computing system 104 via the interactive computing environment 107. The risk assessment computing system 130 can receive a request, for example from the user computing system 106, to access the interactive computing environment 107 and can use data, such as the real-time data 124, the historical data 125, or any other suitable data or signals determined therefrom, to determine whether to provide access, to challenge the request, to deny the request, etc. An electronic interaction between the user computing system 106 and the client computing system 104 can include, for example, the user computing system 106 being used to request a financial loan or other suitable services or products from the client computing system 104, and so on. An electronic interaction between the user computing system 106 and the client computing system 104 can also include, for example, one or more queries for a set of sensitive or otherwise controlled data, accessing online financial services provided via the interactive computing environment 107, submitting an online credit card application or other digital application to the client computing system 104 via the interactive computing environment 107, operating an electronic tool within the interactive computing environment 107 (e.g., a content-modification feature, an application-processing feature, etc.), etc.

In some aspects, an interactive computing environment 107 implemented through the client computing system 104 can be used to provide access to various online functions. As a simplified example, a user interface or other interactive computing environment 107 provided by the client computing system 104 can include electronic functions for requesting computing resources, online storage resources, network resources, database resources, or other types of resources. In another example, a website or other interactive computing environment 107 provided by the client computing system 104 can include electronic functions for obtaining one or more financial services, such as an asset report, management tools, credit card application and transaction management workflows, electronic fund transfers, etc.

A user computing system 106 can be used to request access to the interactive computing environment 107 provided by the client computing system 104. The client computing system 104 can submit a request, such as in response to a request made by the user computing system

106 to access the interactive computing environment 107, for risk assessment to the risk assessment computing system 130 and can selectively grant or deny access to various electronic functions based on risk assessment performed by the risk assessment computing system 130. Based on the request, or continuously or substantially contemporaneously, the risk assessment computing system 130 can determine one or more risk signals or risk indicators for data associated with an identity provided by a target entity, which may submit or may have submitted the request via the user computing system 106. Based on a risk indicator determined from the linked graph 115 having the one or more risk signals applied thereto, the risk assessment computing system 130, the client computing system 104, or a combination thereof can determine whether to grant the access request of the user computing system 106 to certain features of the interactive computing environment 107. The risk assessment computing system 130, the client computing system 104, or a combination thereof can use the risk indicator for other suitable purposes such as identifying a manipulated identity, controlling a real-world interaction, and the like.

In a simplified example, the system illustrated in FIG. 1 can configure the risk assessment server 118 to be used for controlling access to the interactive computing environment 107. The risk assessment server 118 can receive data about a target entity that submitted a request to access the interactive computing environment 107, for example, based on the information (e.g., information collected by the client computing system 104 via a user interface provided to the user computing system 106) provided by the client computing system 104 or received via other suitable computing systems. The risk assessment server 118 can receive, for example from the linked graph server 110, a linked graph 115 that includes data (e.g., the real-time data 124, the historical data 125, etc.) about the target entity. The risk assessment server 118 can determine a risk indicator for the target entity based at least in part on one or more risk signals applied to the linked graph 115. The risk assessment server 118 can transmit the risk indicator, or any inference derived therefrom, to the client computing system 104 for use in controlling access to the interactive computing environment 107.

The linked graph 115, or any suitable score or comparison determined therefrom (e.g., the one or more risk signals, the risk indicator, etc.), can be utilized, for example by the risk assessment computing system 130, the client computing system 104, etc., to determine whether the risk associated with the target entity accessing a good or a service provided by the client computing system 104 exceeds a threshold, thereby granting, challenging, or denying access by the target entity to the interactive computing environment 107. For example, if the risk assessment computing system 130 determines that the risk indicator indicates that risk of the target entity is lower than a threshold value, then the client computing system 104 associated with the service provider can generate or otherwise provide access permission to the user computing system 106 that requested the access. The access permission can include, for example, cryptographic keys used to generate valid access credentials or decryption keys used to decrypt access credentials. The client computing system 104 can also allocate resources to the target entity and provide a dedicated web address for the allocated resources to the user computing system 106, for example, by adding the user computing system 106 in the access permission. With the obtained access credentials or the dedicated web address, the user computing system 106 can establish a secure network connection to the interactive computing environment 107 hosted by the client computing system 104 and access the resources via invoking API calls, web service calls, HTTP requests, other suitable mechanisms or techniques, etc.

In some examples, the risk assessment computing system 130 may determine whether to grant, challenge, or deny the access request made by the user computing system 106 for accessing the interactive computing environment 107. For example, based on the linked graph 115 or associated risk indicator or other inferences, the risk assessment computing system 130 can determine that the target entity is a legitimate entity that made the access request and may authenticate the request. In other examples, the risk assessment computing system 130 can challenge or deny the access attempt if the risk assessment computing system 130 determines that the target entity may not be a legitimate entity.

Each communication within the computing environment 100 may occur over one or more data networks, such as a public data network 108, a network 116 such as a private data network, or some combination thereof. A data network may include one or more of a variety of different types of networks, including a wireless network, a wired network, or a combination of a wired and wireless network. Examples of suitable networks include the Internet, a personal area network, a local area network ("LAN"), a wide area network ("WAN"), or a wireless local area network ("WLAN"). A wireless network may include a wireless interface or a combination of wireless interfaces. A wired network may include a wired interface. The wired or wireless networks may be implemented using routers, access points, bridges, gateways, or the like, to connect devices in the data network.

The number of devices depicted in FIG. 1 is provided for illustrative purposes. Different numbers of devices may be used. For example, while certain devices or systems are shown as single devices in FIG. 1, multiple devices may instead be used to implement these devices or systems. Similarly, devices or systems that are shown as separate, such as the risk assessment server 118 and the entity data and interaction data repository 123, etc., may be instead implemented in a single device or system. Similarly and as discussed above, the risk assessment computing system 130 may be a part of the client computing system 104.

Artificial Intelligence Techniques for Determining a Risk Indicator for a Target Entity FIG. 2 is a flow chart illustrating an example of a process 200 for determining whether an identity is manipulated using artificial intelligence techniques according to certain aspects of the present disclosure. One or more computing devices, such as the risk assessment computing system 130, may implement operations illustrated in FIG. 2 by executing suitable program code such as the linked graph model 112, the risk prediction model 120, or the like. For illustrative purposes, the process 200 is described with reference to certain examples depicted in the figures. Other implementations, however, are possible.

At block 202, the process 200 involves receiving entity data and interaction data associated with a target entity. The entity data may include identity data such as a name, a physical address, a digital address, a Social Security number, a phone number, and the like that may be used to identify the target entity. The interaction data may include data about one or more interactions with which the target entity is associated. For example, the interaction data may include a day or time of a particular interaction, an amount of resources associated with the particular interaction, a separate entity with which the target entity is interacting, a type of device used by the target entity to engage in the interaction, and the like. The entity data, the interaction data, or a combination thereof may be or include real-time data, historical data, or a combination thereof. In a particular example, the entity data and the interaction data may be streamed in real-time (e.g., substantially contemporaneously) to the risk assessment computing system 130 from the external data systems 109, from the client computing systems 104, or a combination thereof. In another example, the risk assessment computing system 130 may receive entity data by accessing a data repository, such as the entity data and interaction data repository 123 and may receive the interaction data in real-time from the external data systems 109, the client computing system 104, or a combination thereof, etc. Other permutations thereof or other suitable sources for the entity data and the interaction data are possible.

At block 204, the process 200 involves determining risk signals associated with the target entity based on the entity data and the interaction data. In some examples, the risk signals can be determined using one or more artificial intelligence models such as the artificial intelligence models 121. The one or more artificial intelligence models may include one or more machine-learning models that may include at least one clustering model, at least one graph mining model, or any other suitable types of machine-learning models. In some examples, the one or more artificial intelligence models may be configured to determine six different types of risk signals, though other suitable numbers (e.g., less than six or more than six) of types of risk signals are possible.

The one or more artificial intelligence models can determine a first type of risk signal associated with a dormant identity. The one or more artificial intelligence models may be trained to define whether a particular identity is dormant or otherwise not in use. A dormant identity may be an identity of an individual who has recently passed away, who has recent changed their name (e.g., due to marriage, etc.), and the like. The one or more artificial intelligence models can determine whether a particular identity is dormant with respect to low-frequency or sparse activity scenarios. The one or more artificial intelligence models can include a time-series-clustering model that can identify historical interactions (e.g., resource applications, personal information updates, and the like) of an entity associated with a potentially dormant identity. The historical interactions can be linked and can be used in a clustering algorithm. For example, kernel density estimation can be used to determine a set of mini-clusters (k mini-clusters), and density-based spatial clustering of applications with noise (DBSCAN) can be used to determine final clusters (N clusters) based on k mini-clusters. Additionally or alternatively, based on the k mini-clusters, Bayesian estimation can be applied to the k mini-clusters, and DBSCAN can be applied to the derived k' clusters. The k mini-clusters and the k' clusters can be compared, and when $\|k\text{-}k'\|$ is larger than a threshold, the associated identity may be considered dormant. In some examples, the k mini-clusters may represent observed activity clusters, and the k' clusters may represent the estimated clusters assuming the associated identity's activity did not change.

The one or more artificial intelligence models can be used to determine whether resources are provided illegitimately. As described herein, illegitimately provided resources may include illegitimately provided credit, though other suitable resources, such as computing resources, etc., are possible. A graph mining algorithm, a graph mining machine-learning model, or the like can be used to identify illegitimate resource creation. Multiple patterns can be considered. For example, personally identifiable information from malicious actors and fake identities used to establish illegitimate resources can be considered. Social media data, or other suitable data, can be mined with text mining algorithms, image recognition algorithms, and the like to identify key patterns underlying the foregoing patterns. Multiple sets of identities can be determined therefrom. An identity graph can be generated by linking address, Social Security number, and email address nodes to be labeled as fraud. Additional legitimate identities can be added to the graph. Graph-based hierarchical clustering can be applied to identify the communities and the identities that are closely binding with fraud nodes.

In some examples, the one or more artificial intelligence models can be used to detect elder abuse or fraud involving elderly entities. Identities of elderly entities, severely ill entities, and the like can be compromised by malicious actors to create manipulated identities, to commit theft, or for other malicious purposes. A natural language processing algorithm, such as Latent Dirichlet Allocation Based Topic Modeling, can be used to classify products into granular categories. Interactions can be aggregated by category for each entity. A k-shape-based time series clustering can be used to identify interaction anomalies, credit inquiry activity anomalies, and the like. The identities that trigger anomaly signals may be identified as manipulated identities.

The one or more artificial intelligence models can be used to identify fake credit file creation. Large numbers (e.g., greater than one billion) of inquiries, interactions, and the like can be data mined for identities in an initial few months of a credit file being created for the respective identities. A file creation path can be generated for each identity to track activity occurring prior to a credit file getting generated. The file creation path may be associated with one or more patterns, and files generated not consistent with the one or more patterns may be associated with a manipulated identity.

The one or more artificial intelligence models may be configured to identify early bust-out signals for a manipulated identity. For each identity, an account or an account card can be linked with interactions. A frequency, volume, and the like of interactions and resources associated therewith can be tracked for each identity. In some examples, a natural language processing model or algorithm can be used to track the foregoing. Abnormal aspects of the interactions or resources associated therewith can be identified using a supervised learning algorithm. Additionally or alternatively, irregular interactions associated with a rare interaction category can be identified. The foregoing can be used to identify potentially manipulated identities.

The one or more artificial intelligence models can be used to identify identity tumbling. Account inquiries associated with identities can be streamed and collected. Identity data, for example as blocks, associated with the identities can be collected. For example, the identity data can include Social Security number blocks, address blocks, and the like. The one or more artificial intelligence models can iterate Social Security number alterations by one digit, two digits, three digits, and the like. Sizes of Social Security number blocks can be tracked over time. For example if the size of a particular Social Security number suddenly increases in a short amount of time (e.g., less than an hour, etc.), the one or more artificial intelligence models can flag the associated numbers as potentially manipulated identities. The same or similar techniques can be used to iterate address blocks, track the address blocks, and identify potentially manipulated identities based on the address blocks, etc. using spatial analysis and the like. Additionally or alternatively, the one or more artificial intelligence models can be used to detect potentially manipulated identities based on name variation. A natural language model or algorithm can be used to evaluate the first and last names of an identity based on the combination of vowels and consonants and common sense of names. Names that are obviously bot-created can be flagged as a manipulated identity. In some examples, a Levenshtein distance can be determined between each name pairs and the letter position can be tracked. A smaller distance and obvious letter position patterns can be considered name alterations and identity manipulation. Additionally or alternatively, behavioral-based bot detection can be used to collect device data that describes how an entity holds a device, how an entity presses buttons, how an entity moves with respect to a mobile device, etc. Metrics that represent how the entity uses the mobile device and how the entity uses input devices for a computing device can be generated. The metrics can be time based, frequency based, spatial based, or any combination thereof. Clustering analysis can be used to identify anomalies for each dimension of the foregoing.

At block 206, the process 200 involves generating a linked graph 115 based at least in part on the entity data and the interaction data. The linked graph 115 may be or include an integrated graph structure, which may be or include a cluster graph, a directed acyclic graph, and the like, that may include an identity graph, an interaction graph, other suitable graphs, or any combination thereof. For example, the risk assessment computing system 130 can generate a first graph structure and a second graph structure based on the entity data and the interaction data. In some examples, the first graph structure may be or include an identity graph, and the second graph structure may be or include an interaction graph. The risk assessment computing system 130, or any component thereof such as the linked graph model 112, etc., may generate the identity graph based on identity data included in the received data and may generate the interaction graph based on interaction data included in the received data, though other types of graphs based on other sets of data may be generated by the risk assessment computing system 130. In some examples, the first graph structure and the second graph structure may each include a set of nodes and a set of connections. Each connection of the set of connections may indicate a relationship between nodes connected by the connection, and each node of the set of nodes may correspond to an entity, an interaction involving a particular entity, or the like.

The risk assessment computing system 130, or any suitable component or service (e.g., the linked graph model 112) thereof, may generate a linked graph structure, such as the linked graph 115, based on the first graph structure and the second graph structure. The risk assessment computing system 130 can link the first graph structure and the second graph structure to generate the linked graph structure. For example, the risk assessment computing system 130 can perform label propagation, clustering, or other suitable graph linking operations to generate the linked graph structure based at least in part on the first graph structure and the second graph structure. In some examples, the risk assessment computing system 130 may link the data included in the first graph structure and the second graph structure to generate linked data. The linked graph structure, or the linked data, may indicate an identity of the target entity and may associate the identity of the target entity with interactions initiated or otherwise involving the target entity. In some examples, the risk assessment computing system 130 may generate the linked graph structure, or the linked data, in response to receiving a request. In other examples, the risk assessment computing system 130 may generate the linked graph structure, or the linked data, periodically or otherwise asynchronously with respect to the request.

At block 208, the process 200 involves applying the one or more risk signals to the linked graph 115 to generate a risk indicator for the target entity. The one or more risk signals may be applied to the linked graph 115 by augmenting the one or more risk signals with the nodes or the connections of the linked graph 115, by generating a metadata file associated with the linked graph 115 having the one or more risk signals, and the like. Applying the one or more risk signals to the linked graph 115 may provide insight into the linked graph 115 that may not have previously been available, determinable, or the like. For example, applying the one or more risk signals to the linked graph 115 may highlight patterns of fraudulent activity associated with the target entity, and the like. The risk assessment computing system 130 can determine the risk indicator based at least in part on the linked graph 115 having the one or more risk signals applied thereto. In some examples, the risk assessment computing system 130, or any component or service (e.g., the risk prediction model 120, etc.) thereof, can apply a clustering model to the linked graph 115 to generate the risk indicator. The risk assessment computing system 130 can use other suitable techniques to determine the risk indicator based on the linked graph 115 having the one or more risk signals applied thereto.

At block 210, the process 200 involves generating a responsive message that can be used to control access to the interactive computing environment 107. In some examples, the risk assessment server 118 (or any other suitable module, model, or computing device) can transmit the responsive message to a computing device (e.g., the client computing system 104) or any other suitable computing device that can control access to the interactive computing environment 107. The responsive message can vary based on the risk indicator determined at the block 208. For example, the responsive message may indicate that the target entity associated with the linked graph 115 is a legitimate entity and may recommend granting access to the interactive computing environment 107, or may recommend initiating an interaction, based on the request. In other examples, the responsive message may indicate that the target entity is associated with a manipulated identity and may recommend challenging or denying any access request, any interaction, and the like. In some examples, the responsive message may be generated and transmitted based on the risk indicator determined at the block 208. The risk indicator can include a credit score, a fraud score, an identity score, other suitable scores indicating risk in one or more multiple dimensions associated with the target entity, or any suitable combination thereof, based on the linked graph 115. The risk assessment server 118 can determine, based on the risk indicator generated by the risk prediction model 120, whether to recommend granting, challenging, or denying a request submitted by the target entity, an interaction initiated by the target entity, etc. In some examples, the risk assessment computing system 130 can generate and transmit the responsive message to grant, challenge, or deny the request based on a recommendation provided by the risk prediction model 120.

Figure 3:
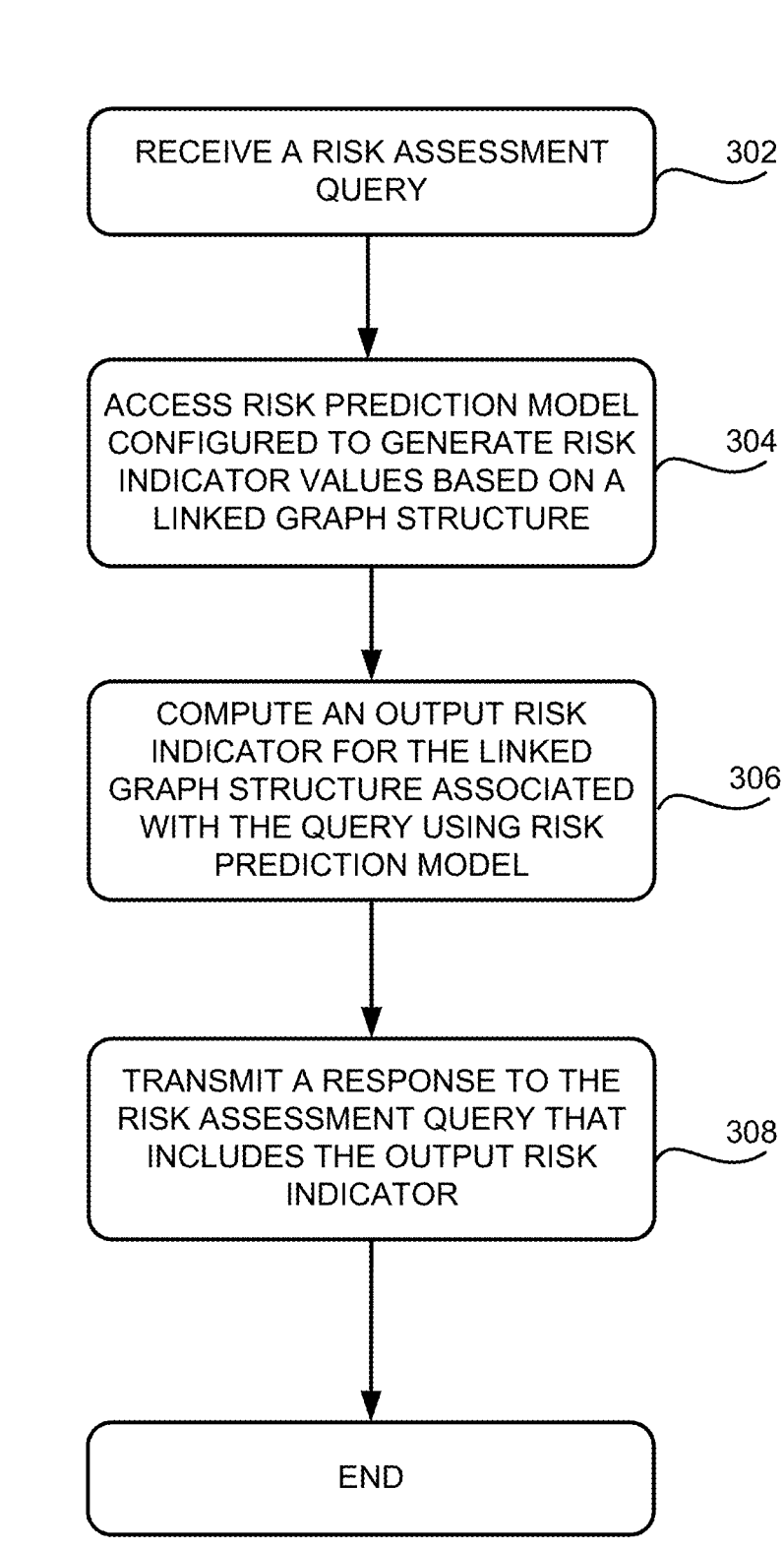
FIG. 3 is a flowchart illustrating an example of a process for determining a risk assessment indicator using artificial intelligence techniques according to certain aspects of the present disclosure.

Techniques for Controlling Access to a Computing Environment Using a Risk Indicator FIG. 3 is a flow chart illustrating an example of a process 300 for determining a risk assessment indicator using artificial intelligence techniques according to certain aspects of the present disclosure. One or more computing devices, such as the risk assessment computing system 130, may implement operations illustrated in FIG. 3 by executing suitable program code such as the linked graph model 112, the risk prediction model 120, and the like. For illustrative purposes, the process 300 is described with reference to certain examples depicted in the figures. Other implementations, however, are possible.

At block 302, the process 300 involves receiving a risk assessment query for a target entity from a remote computing device such as a computing device associated with the target entity requesting the risk assessment. The risk assessment query can also be received by the risk assessment server 118 from a remote computing device associated with an entity authorized to request risk assessment of the target entity. The risk assessment query may involve a request for determination for whether the target entity is associated with a potentially manipulated identity, or the like.

At block 304, the process 300 involves accessing a risk prediction model 120 trained to generate risk indicator values based on a linked graph structure, such as the linked graph 115, associated with the target entity. In some examples, the risk prediction model 120 may additionally or alternatively be or include one or more proprietary models (e.g., artificial intelligence models, machine-learning models, etc.), one or more heuristics models, and/or one or more simulation models. The linked graph 115 can be generated based at least in part on data such as entity data, identity data, and the like. Additionally or alternatively, one or more risk signals, such as those determined by one or more artificial intelligence models as described with respect to the block 204, can be applied to the linked graph 115. As described in more detail with respect to FIG. 1 above, (i) examples of entity data can include identity data, such as name, address, etc., and (ii) examples of interaction data can include a time of interaction, an amount of resources associated with the interaction, etc. The risk indicator can indicate a level of risk associated with the entity, and the risk indicator can include indicators such as a credit score or fraud score of the target entity. In some examples, the linked graph 115 can be used to determine the risk indicator. For example, the risk prediction model 120 can traverse the linked graph 115, can execute one or more clustering or other suitable machine-learning models on the linked graph 115, and the like to determine the risk indicator.

At block 306, the process 300 involves computing a risk indicator for the target entity based on the linked graph 115 using the risk prediction model 120. The linked graph 115, or any suitable risk score determined or received therefrom, can be used as input to the risk prediction model 120. The linked graph 115 associated with the target entity can be generated based on data, such as the entity data and the interaction data, both or either of which may be real-time data, historical data, or a combination thereof, about the target entity. The output of the risk prediction model 120 can include the risk indicator for the target entity.

At block 308, the process 300 involves transmitting a responsive message based on the risk indicator, which may be determined at the block 306. In some examples, the risk assessment server 118 (or any other suitable module, model, or computing device) can transmit the responsive message to a computing device (e.g., the client computing system 104) or any other suitable computing device that can control access to the interactive computing environment 107. The responsive message can vary based on the risk indicator. For example, the responsive message may indicate that the target entity submitting the access request is a legitimate entity (e.g., not associated with a potentially manipulated identity)

and may recommend granting access to the interactive computing environment 107 based on the request. In other examples, the responsive message may indicate that the entity has a manipulated identity or may otherwise not be associated with legitimate activity and may recommend challenging or denying the request.

In some examples, the responsive message may be generated and transmitted based on the linked graph 115. For example, the risk prediction model 120 can generate one or more risk indicators for the target entity based on the linked graph 115, and the risk assessment server 118 can generate the responsive message based on the one or more risk indicators. The one or more risk indicators can include a credit score, a fraud score, an identity score, other suitable scores indicating risk in one or more multiple dimensions associated with the target entity, or any suitable combination thereof, based on the linked graph 115 or any inference determined therefrom. The risk prediction model 120 can generate the risk indicator by applying a clustering model to the linked graph 115 or using other suitable techniques. The risk assessment server 118 can determine, based on the one or more risk indicators generated by the risk prediction model 120, whether to recommend granting, challenging, or denying the request submitted by the target entity. In some examples, the risk assessment computing system 130 can generate and transmit the responsive message to grant, challenge, or deny the request based on a recommendation provided by the risk prediction model 120.

Figure 4:
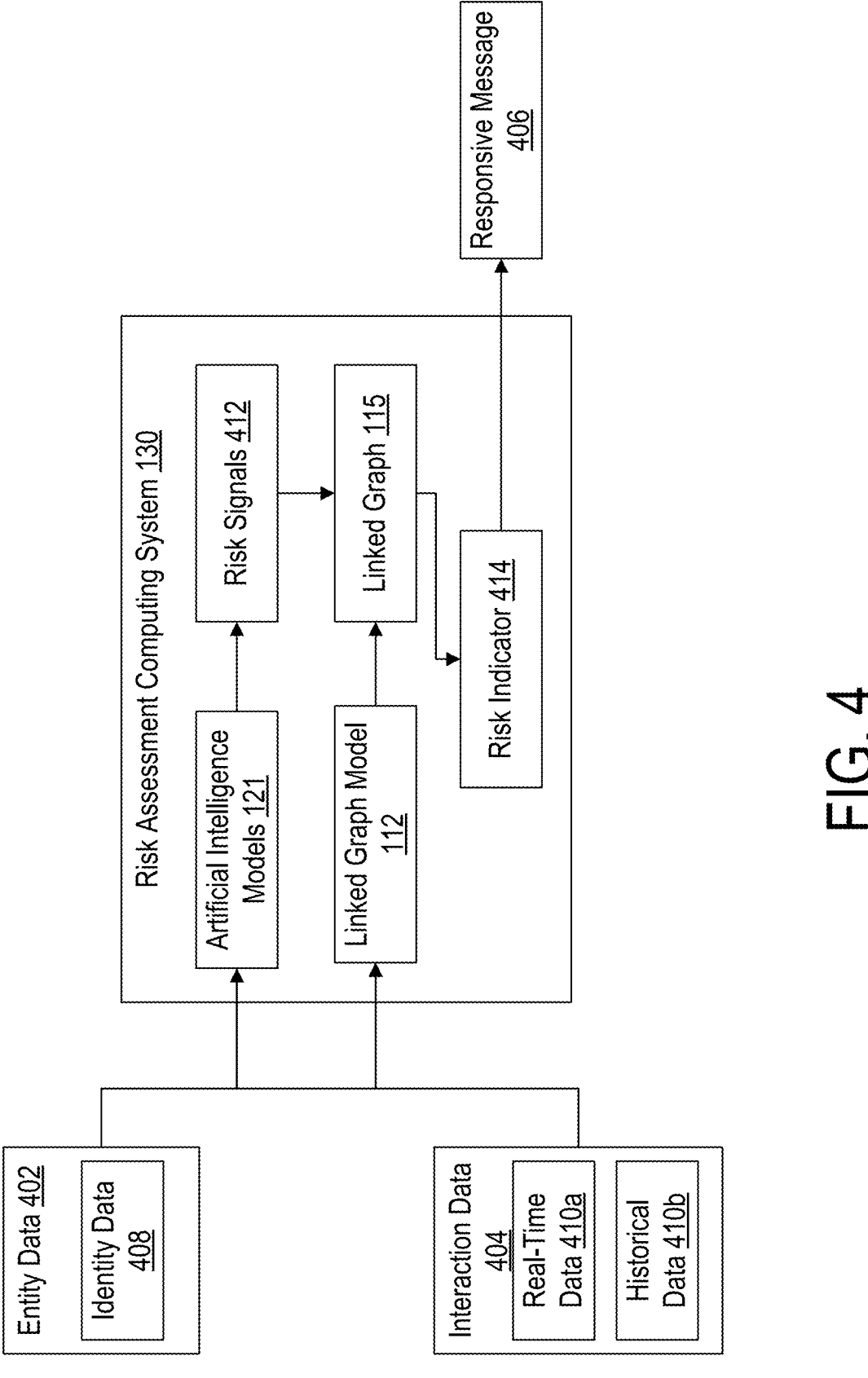
FIG. 4 is a block diagram illustrating a data flow for determining whether an identity is manipulated using artificial intelligence techniques according to certain aspects of the present disclosure.

Data Flow for Generating a Risk Indicator Using Artificial Intelligence Techniques FIG. 4 is a block diagram illustrating a data flow 400 for determining whether an identity is manipulated using artificial intelligence techniques according to certain aspects of the present disclosure. As illustrated, the data flow 400 can include entity data 402, interaction data 404, the risk assessment computing system 130, and a responsive message 406, though the data flow 400 can include other or additional components. The entity data 402 and the interaction data 404 can be received by the risk assessment computing system 130. In some examples, the entity data 402, the interaction data 404, or a combination thereof may be or include online (e.g., real-time) data, offline (e.g., historical) data, or a combination thereof.

The entity data 402 may include identity data 408. The identity data 408 can include a name of a target entity, a physical address of the target entity, a digital address of the target entity, familial members of the target entity, a Social Security number of the target entity, and any other suitable personally identifiable information for the target entity. The identity data 408 may be stored in a data repository, such as the entity data and interaction data repository 123, and the risk assessment computing system 130 can access the data repository to receive the identity data 408. In other examples, the identity data 408 may be streamed, such as in approximately real-time, to the risk assessment computing system 130 based on streamed interactions.

The interaction data 404 may include real-time interaction data 410a and historical interaction data 410b, though other suitable data or types of data are possible. Interaction data may include a time or day of a particular interaction, a type or amount of resources associated with the particular interaction, separate entities with which the target entity interacts with for the particular interaction, and the like. The real-time interaction data 410a may be generated in approximately real-time and may be streamed or otherwise substantially contemporaneously transmitted to the risk assessment computing system 130. The historical interaction data 410b may be stored in a data repository such as the entity data and interaction data repository 123. The risk assessment computing system 130 can access the data repository to receive the historical interaction data 410b.

The entity data 402, the interaction data 404, or a combination thereof can be transmitted to or otherwise suitably received by the risk assessment computing system 130. In a particular example, the entity data 402 and the interaction data 404 can be streamed to the artificial intelligence models 121, the linked graph model 112, or a combination thereof. The artificial intelligence models 121 can include one or more machine-learning models, such as a clustering model, a graph mining model, and the like, and the linked graph model 112 can be configured to generate a linked graph 115 using the entity data 402 and the interaction data 404 as input. The artificial intelligence models 121 may be configured to receive as input the entity data 402 and the interaction data 404 and to output or otherwise generate risk signals 412 associated with the entity data 402 and the interaction data 404. In a particular example, the risk signals 412 may each indicate a likelihood of a particular data point or set of data points of the entity data 402 and the interaction data 404 representing a manipulated identity or otherwise being associated with the manipulated identity.

The linked graph model 112 can generate the linked graph 115 using the entity data 402 and the interaction data 404. For example, the linked graph model 112 can generate a first graph using the entity data 402 and can generate a second graph using the interaction data 404. The linked graph model 112 can integrate the first graph and the second graph to generate the linked graph 115. In other examples, the linked graph model 112 can integrate the entity data 402 and the interaction data 404 and can generate the linked graph 115 using the integrated data. The linked graph model 112, or the risk prediction model 120 or any other suitable component or service of the risk assessment computing system 130, can apply the risk signals 412 to the linked graph 115. Applying the risk signals 412 to the linked graph 115 can involve augmenting the linked graph 115 with additional nodes, connections, or the like representing the risk signals 412. In other examples, applying the risk signals 412 may involve generating a metadata file with the risk signals 412 and appending the linked graph 115 with the metadata file.

The risk assessment computing system 130, or any component or service (e.g., the risk prediction model 120, etc.) thereof, can determine a risk indicator 414 based at least in part on the linked graph 115 and the risk signals 412. For example, the risk assessment computing system 130 can execute a clustering model on the linked graph 115 having the risk signals 412 to determine the risk indicator 414. The risk assessment computing system 130 can use any other suitable models or techniques to determine the risk indicator 414 using the linked graph 115 and the risk signals 412. The risk assessment computing system 130 can use the risk indicator 414 to generate the responsive message 406, which may be used to control access of the target entity to an interactive computing environment, to control a real-world or digital interaction involving the target entity, and the like.

Example of Computing System

Figure 5:
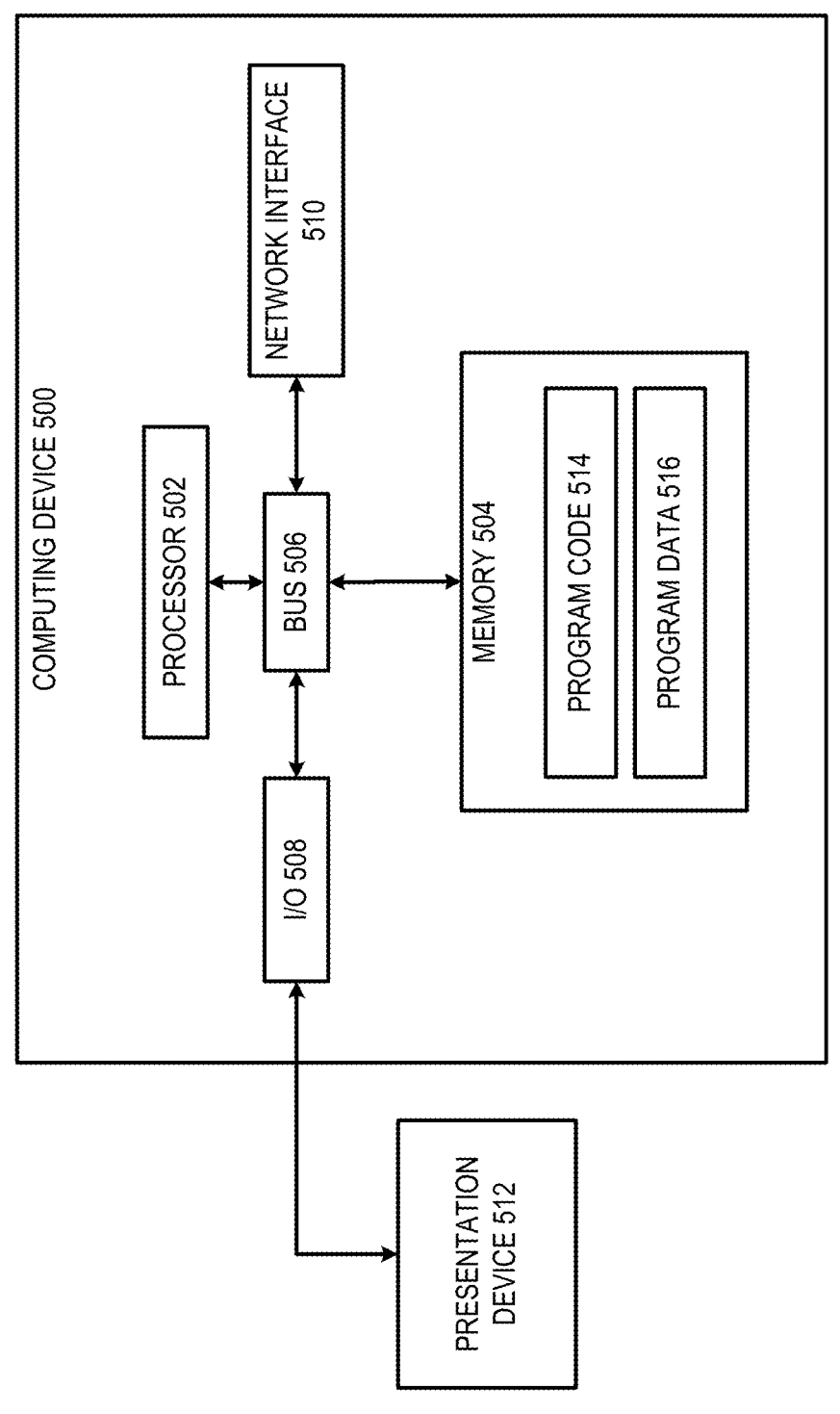
FIG. 5 is a block diagram depicting an example of a computing system suitable for implementing aspects of the techniques and technologies presented herein.

Any suitable computing system or group of computing systems can be used to perform the operations for the machine-learning operations or artificial intelligence operations described herein. For example, FIG. 5 is a block diagram illustrating an example of a computing device 500, which can be used to implement the risk assessment server 118 or other suitable components of the computing environment 100. The computing device 500 can include various devices for communicating with other devices in the computing environment 100, for example as described with respect to FIG. 1. The computing device 500 can include various devices for performing one or more data consolidation or validation operations, or other suitable operations, described above with respect to FIGS. 1-4.

The computing device 500 can include a processor 502 that is communicatively coupled to a memory 504. The processor 502 can execute computer-executable program code stored in the memory 504, can access information stored in the memory 504, or both. Program code may include machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing or receiving information, data, arguments, parameters, or memory contents. Information, arguments, parameters, data, etc., may be passed, forwarded, or transmitted via any suitable means including memory sharing, message passing, token passing, network transmission, among others.

Examples of a processor 502 can include a microprocessor, an application-specific integrated circuit (ASIC), a field-programmable gate array (FPGA), or any other suitable processing device. The processor 502 can include any suitable number of processing devices, including one. The processor 502 can include or communicate with a memory 504. The memory 504 can store program code that, when executed by the processor 502, causes the processor 502 to perform the operations described herein.

The memory 504 can include any suitable non-transitory computer-readable medium. The computer-readable medium can include any electronic, optical, magnetic, or other storage device capable of providing a processor with computer-readable program code or other program code. Non-limiting examples of a computer-readable medium can include a magnetic disk, memory chip, optical storage, flash memory, storage class memory, ROM, RAM, an ASIC, magnetic storage, or any other medium from which a computer processor can read and execute program code. The program code may include processor-specific program code generated by a compiler or an interpreter from code written in any suitable computer-programming language. Examples of suitable programming language can include Hadoop, C, C++, C#, Visual Basic, Java, Python, Perl, JavaScript, ActionScript, etc.

The computing device 500 may also include a number of external or internal devices such as input or output devices. For example, the computing device 500 is illustrated with an input/output interface 508 that can receive input from input devices or provide output to output devices. A bus 506 can also be included in the computing device 500. The bus 506 can communicatively couple one or more components of the computing device 500.

The computing device 500 can execute program code 514 that can include the linked graph model 112, the artificial intelligence models 121, and the like. The program code 514 for the linked graph model 112, the artificial intelligence models 121, and the like may be resident in any suitable computer-readable medium and may be executed on any suitable processing device. For example, as depicted in FIG. 5, the program code 514 for the linked graph model 112 or the artificial intelligence models 121 can reside in the memory 504 at the computing device 500 along with the program data 516 associated with the program code 514. Executing the linked graph model 112 or the artificial intelligence models 121 can configure the processor 502 to perform one or more of the operations described herein.

In some aspects, the computing device 500 can include one or more output devices. One example of an output device can be the network interface device 510 depicted in FIG. 5. A network interface device 510 can include any device or group of devices suitable for establishing a wired or wireless data connection to one or more data networks described herein. Non-limiting examples of the network interface device 510 can include an Ethernet network adapter, a modem, etc.

Another example of an output device can include the presentation device 512 depicted in FIG. 5. A presentation device 512 can include any device or group of devices suitable for providing visual, auditory, or other suitable sensory output. Non-limiting examples of the presentation device 512 can include a touchscreen, a monitor, a speaker, a separate mobile computing device, etc. In some aspects, the presentation device 512 can include a remote client-computing device that can communicate with the computing device 500 using one or more data networks described herein. In other aspects, the presentation device 512 can be optional.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

What is claimed is:

1. A system comprising:
a processor; and
a non-transitory computer-readable medium comprising instructions that are executable by the processor to cause the processor to perform operations comprising:
    receiving entity data and interaction data associated with a target entity;
    determining, based on the entity data and the interaction data, one or more risk signals associated with the target entity using one or more artificial intelligence models;
    generating a first graph structure of a linked graph structure using the entity data, wherein the first graph structure represents identity data about the target entity;
    generating a second graph structure of the linked graph structure using the interaction data, wherein the second graph structure represents historical interaction data associated with the target entity;
    linking the first graph structure and the second graph structure to form the linked graph structure by integrating the entity data and the identity data, wherein one or more identities indicated by the first graph structure are associated with one or more interactions of the historical interaction data of the second graph structure;
    applying the one or more risk signals to the linked graph structure to determine a risk indicator associated with the target entity;
    determining, based on the risk indicator, that the target entity is associated with malicious behavior; and
    preventing, based on determining that the target entity is associated with malicious behavior, the target entity from accessing an interactive computing environment.

2. The system of claim 1, wherein the one or more risk signals indicate a likelihood that an identity of the target entity is manipulated.

3. The system of claim 1, wherein the one or more artificial intelligence models comprise a plurality of machine-learning models that comprises at least one clustering machine-learning model and at least one graph mining machine-learning model.

4. The system of claim 1, wherein the operation of applying the one or more risk signals to the linked graph structure comprises clustering data underlying the linked graph structure to determine the risk indicator, and wherein the data underlying the linked graph structure comprises the one or more risk signals.

5. The system of claim 1, wherein the operations further comprise providing a responsive message based on the risk indicator by controlling an interaction involving the target entity using the risk indicator.

6. The system of claim 1, wherein the entity data comprises identity information about the target entity, wherein the identity information comprises name information, account information, and device information associated with the target entity, and wherein the interaction data comprises information about previously executed interactions involving the target entity.

7. A method comprising:
receiving, by a computing device, entity data and interaction data associated with a target entity;
determining, by the computing device and based on the entity data and the interaction data, one or more risk signals associated with the target entity using one or more artificial intelligence models;
generating, by the computing device, a first graph structure of a linked graph structure using the entity data, wherein the first graph structure represents identity data about the target entity;
generating, by the computing device, a second graph structure of the linked graph structure using the interaction data, wherein the second graph structure represents historical interaction data associated with the target entity;
linking, by the computing device, the first graph structure and the second graph structure to form the linked graph structure by integrating the entity data and the identity data, wherein one or more identities indicated by the first graph structure are associated with one or more interactions of the historical interaction data of the second graph structure;
applying, by the computing device, the one or more risk signals to the linked graph structure to determine a risk indicator associated with the target entity;
determining, based on the risk indicator, that the target entity is associated with malicious behavior; and
preventing, based on determining that the target entity is associated with malicious behavior, the target entity from accessing an interactive computing environment.

8. The method of claim 7, wherein the one or more risk signals indicate a likelihood that an identity of the target entity is manipulated.

9. The method of claim 7, wherein the one or more artificial intelligence models comprise a plurality of machine-learning models that comprises at least one clustering machine-learning model and at least one graph mining machine-learning model.

10. The method of claim 7, wherein applying the one or more risk signals to the linked graph structure comprises clustering data underlying the linked graph structure to determine the risk indicator, and wherein the data underlying the linked graph structure comprises the one or more risk signals.

11. The method of claim 7, further comprising providing a responsive message based on the risk indicator by controlling an interaction involving the target entity using the risk indicator.

12. The method of claim 7, wherein the entity data comprises identity information about the target entity, wherein the identity information comprises name information, account information, and device information associated with the target entity, and wherein the interaction data comprises information about previously executed interactions involving the target entity.

13. A non-transitory computer-readable medium comprising instructions that are executable by a processing device for causing the processing device to perform operations comprising:

receiving entity data and interaction data associated with a target entity;

determining, based on the entity data and the interaction data, one or more risk signals associated with the target entity using one or more artificial intelligence models;

generating a first graph structure of a linked graph structure using the entity data, wherein the first graph structure represents identity data about the target entity;

generating a second graph structure of the linked graph structure using the interaction data, wherein the second graph structure represents historical interaction data associated with the target entity;

linking the first graph structure and the second graph structure to form the linked graph structure by integrating the entity data and the identity data, wherein one or more identities indicated by the first graph structure are associated with one or more interactions of the historical interaction data of the second graph structure;

applying the one or more risk signals to the linked graph structure to determine a risk indicator associated with the target entity;

determining, based on the risk indicator, that the target entity is associated with malicious behavior; and preventing, based on determining that the target entity is associated with malicious behavior, the target entity from accessing an interactive computing environment.

14. The non-transitory computer-readable medium of claim 13, wherein the one or more risk signals indicate a likelihood that an identity of the target entity is manipulated, and wherein the one or more artificial intelligence models comprise a plurality of machine-learning models that comprises at least one clustering machine-learning model and at least one graph mining machine-learning model.

15. The non-transitory computer-readable medium of claim 13, wherein the operation of applying the one or more risk signals to the linked graph structure comprises clustering data underlying the linked graph structure to determine the risk indicator, and wherein the data underlying the linked graph structure comprises the one or more risk signals.

16. The non-transitory computer-readable medium of claim 13, wherein the operations further comprise providing a responsive message based on the risk indicator by controlling an interaction involving the target entity using the risk indicator.

17. The non-transitory computer-readable medium of claim 13, wherein the entity data comprises identity information about the target entity, wherein the identity information comprises name information, account information, and device information associated with the target entity, and wherein the interaction data comprises information about previously executed interactions involving the target entity.

* * * * *